United States Patent [19]

Villanueva

[11] 4,044,748
[45] Aug. 30, 1977

[54] CONTINUOUS CUTTING MACHINE FOR STONE AND BUILDING MATERIALS

[76] Inventor: Eliseo Herrando Villanueva, Ctra. de Barcelona Km. 9, Museros Valencia, Spain

[21] Appl. No.: 638,787

[22] Filed: Dec. 8, 1975

[30] Foreign Application Priority Data

Feb. 5, 1975 Spain .................................. 209676

[51] Int. Cl.² ............................................. B28D 1/04
[52] U.S. Cl. .................... 125/13 R; 51/76 R; 198/339
[58] Field of Search ............. 198/195, 196; 125/13 R, 125/12; 51/76 R

[56] References Cited

U.S. PATENT DOCUMENTS

| | | | |
|---|---|---|---|
| 513,952 | 1/1894 | McMahon | 198/196 |
| 1,124,722 | 1/1915 | Gardella | 198/196 |
| 2,747,565 | 5/1956 | Henderson | 125/13 R |
| 3,127,886 | 4/1964 | Miller | 125/13 R |

Primary Examiner—Harold D. Whitehead
Attorney, Agent, or Firm—Ladas, Parry, Von Gehr, Goldsmith & Deschamps

[57] ABSTRACT

A cutting machine for petrous and building materials comprises first, second and third endless conveyor belts. The first belt is made up of a plurality of plates which extend transversely to the direction of travel of the first belt and are journalled together. Each plate has a central projection extending in the direction of travel, the central projections together forming a longitudinal partition which acts to divide the upper strand of the first conveyor belt into two zones. The second conveyor belt is aligned with the first belt at the discharge end thereof, to receive and convey material that has been conveyed by the first belt to its discharge end. The third endless conveyor belt is aligned with the second endless conveyor belt at the discharge end thereof and comprises at least two parallel endless belts having a space therebetween for permitting waste material to fall therethrough.

1 Claim, 9 Drawing Figures

CONTINUOUS CUTTING MACHINE FOR STONE AND BUILDING MATERIALS

The object of the present invention is to provide the market and the public in general with a continuous cutting machine for petrous and building materials, the result of a vast experience gained by the applicant from the study and wide knowledge of the matter, with the use of which the maximum results are obtained, departing from a really simplified organization.

The cutting machine in question pertains to the type of machines which are comprised of an endless conveyor belt which, acting as a movable table, carries out the movement of the materials to be cut under the field of action of a transversal shaft having abrasive circular saws, subjected during the cutting operation to cooling under water.

The object of the present application resides in the special arrangement of the conveyor belt in which two longitudinal channels are obtained, acting as positioning dihedrals of the materials to be cut, whose walls, projecting from the plane of the conveyor belt, act at the same time as sliding guides for the return strand of the belt itself, thus preventing the formation of the catenary curve thereof; the contribution of outlet conveyor trains of the cut material, separating the usable material from the scrap material; and the special system for controlling and adjusting the passage of the water-cooled collector to the diffusing nozzles or venturis arranged between the cutting discs, as well as the constitution of these latter.

In order to clarify, graphically, the idea to be described, a set of drawings is accompanied to the specification, which forms an integral part thereof, wherein the following is represented.

Figure 1:
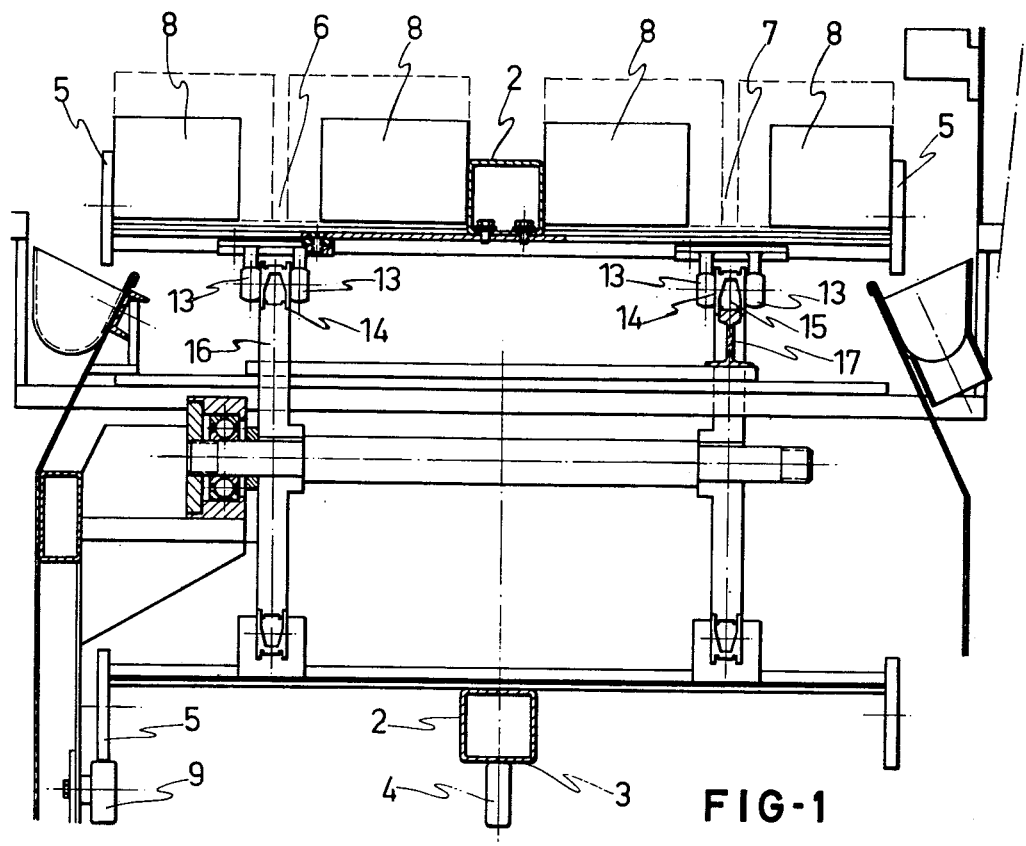
FIG. 1 shows a schematic cross-sectional view of the main conveyor belt of the machine.

FIG. 1 represents a schematic cross-sectional view of the conveyor belt of the machine or main conveyor train thereof, illustrating the special shape of the plates 1 journalled to each other, and the central partitions or projections 2 and collateral projections 5 which determine the longitudinal channels 6 and 7 as positioning dihedrals of the material to be cut 8, while these projections or partions 2 and 5 act, at the same time, in the lower or return strand of the conveyor belt, as a central shoe 3, and the collateral projection 5 acts on bearings or rollers 4 and 9, to prevent the formation of the catenary curve of the series of plates 1 journalled to each other and forming the conveyor belt.

This figure also illustrates the articulation ratio of said series of plates 1, by means of the anchoring thereof, respectively, to the series of plates 1C which, with their arms 11, constitute the links of parallel driving chains, on toothed wheels 16, which arms 11, provided with end cylinders 13 and intermediate rollers 14 having a throat 15, act as pilot sliding bearings on rails 17 proportioning the coplanar arrangement of the plates 1 of the conveyor belt in the upper or working strand thereof.

Figure 2:
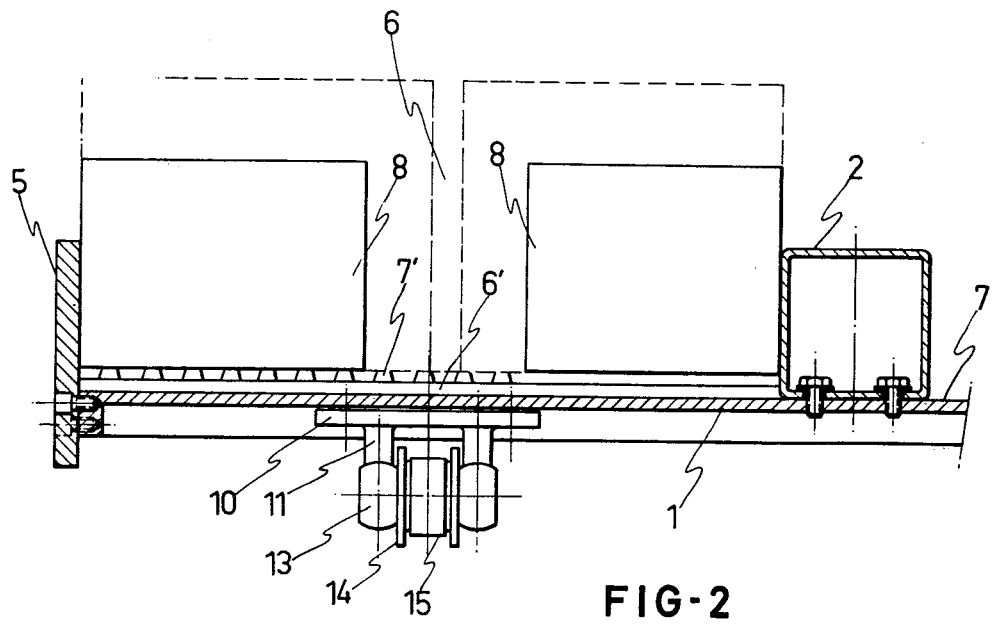
FIG. 2 shows to an enlarged scale a detail of the view shown in FIG. 1.

FIG. 2 illustrates an enlarged detail of the same cross-sectional view of the preceding figure, wherein it can be appreciated more clearly, although partially, the constitution of each one of the plates 1 forming the conveyor belt. It can furthermore be seen that the surface of the bottom 6 and 7 of each one of the channels formed between the central partion or projection 2 and collateral projection 5 is coated with a resilient layer 6' of rubber or the like, with upper reliefs 7' which determine a perfect gripping or fastening of the piece or material to be cut 8.

Figure 3:
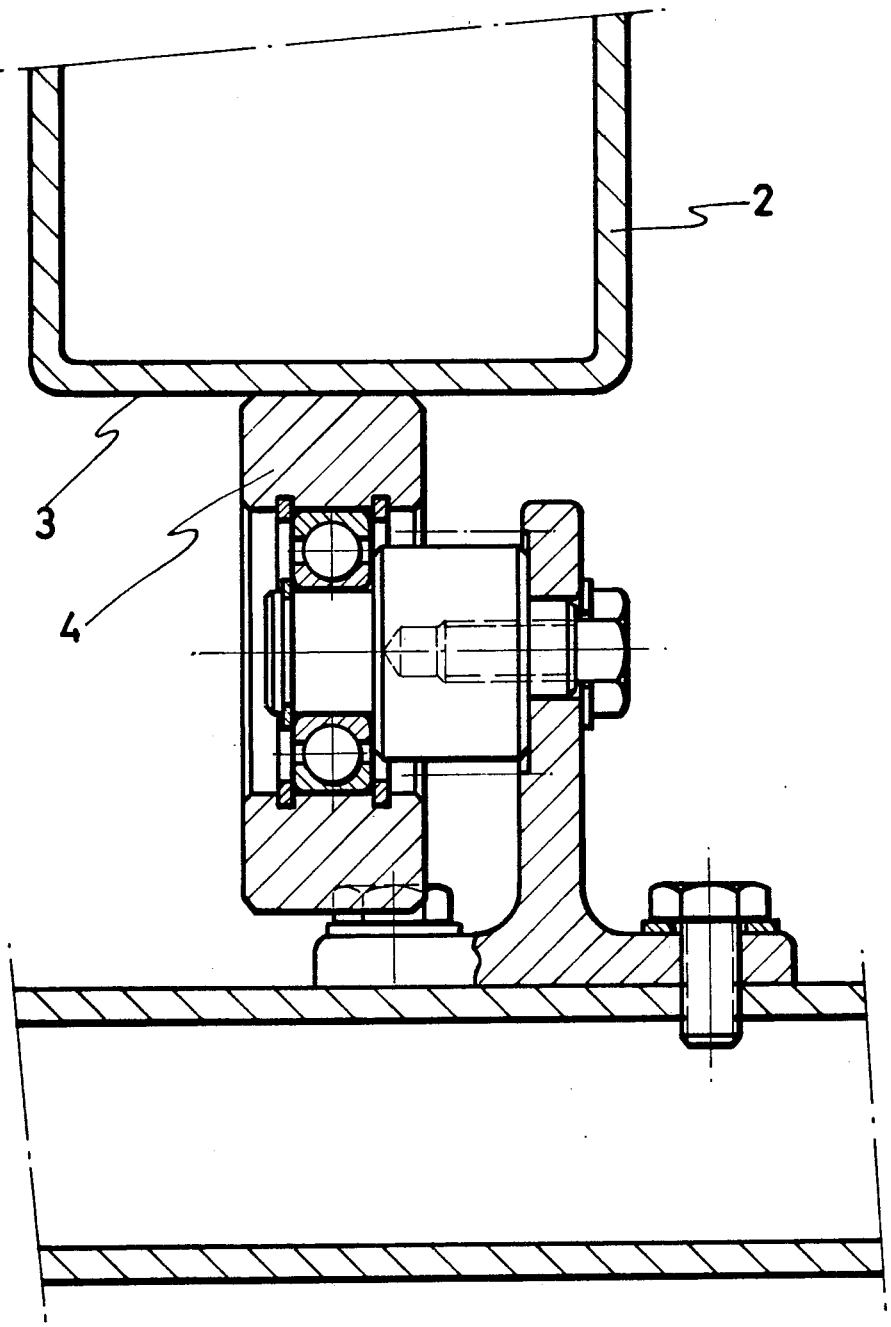
FIG. 3 shows to an enlarged scale a further detail of the view shown in FIG. 1.

FIG. 3 illustrates an enlarged detail of the two central bearings or rollers 4 which act as sliding guides for the central projections or partitions 2 of the plates 1 which act as shoes 3 to prevent the catenary curve of the conveyor belt.

Figure 4:
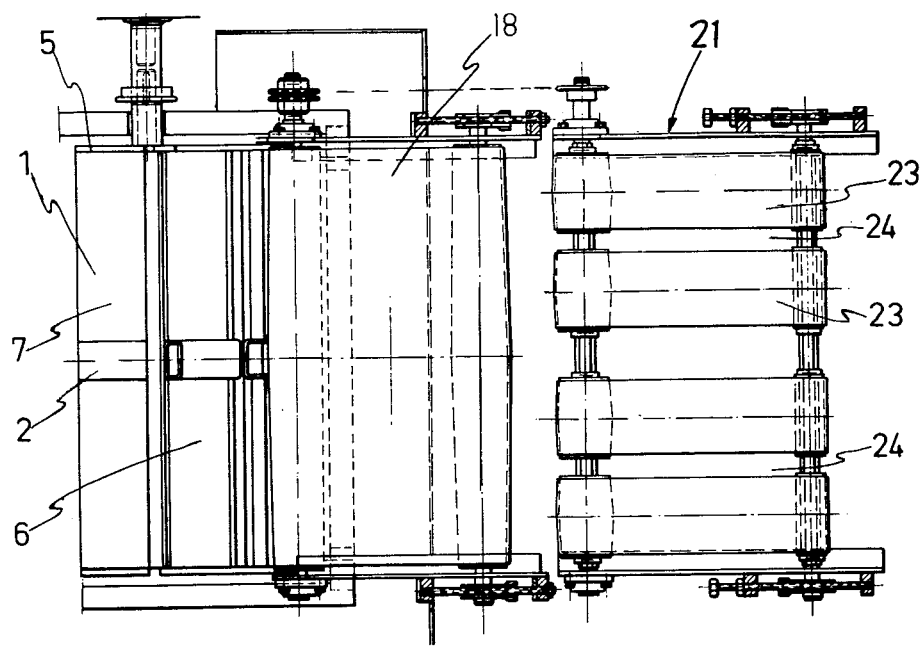
FIG. 4 shows a schematic plan view of the outlet end of the main conveyor belt and shows also the two auxiliary conveyors.

FIG. 4 schematically represents a plan view of the outlet end of the conveyor belt formed by said series of plates 1 journalled to each other with the incorporation of the auxiliary conveyor trains 18 and 21 arranged in successive longitudinal prolongation. It can also be seen that the second conveyor belt 18 is constituted of a single endless belt, while the third conveyor belt or train 21 is constituted by various parallel endless belts 23 with a spacing 24 therebetween. It can furthermore be seen that the spacings 24 of the belts 23 of this third conveyor train 21 coincide longitudinally with the central regions of the channels 6 and 7 of the first conveyor belt and with the central partition or projection 2 thereof.

Figure 5:
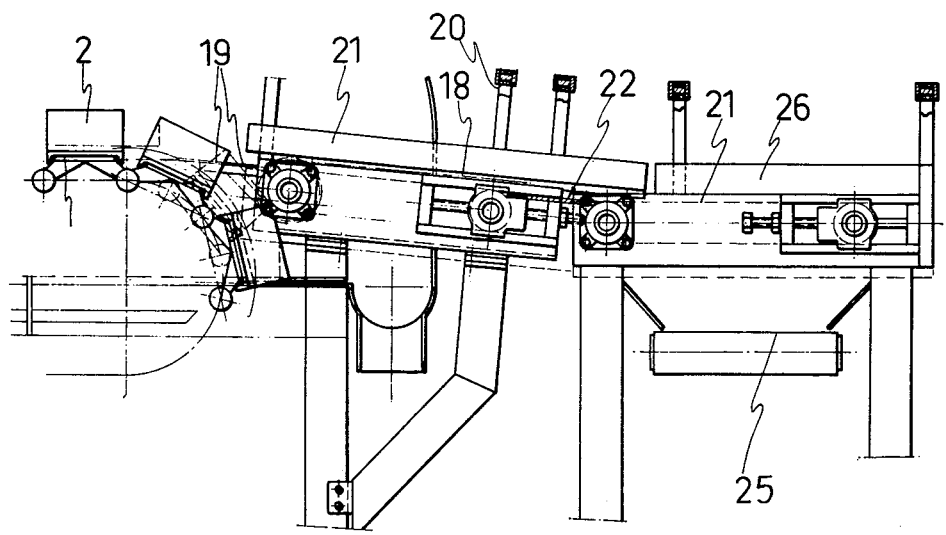
FIG. 5 shows a partial side elevation of the part of the machine that is shown in FIG. 4.

FIG. 5 represents a partial side elevational view of the outlet end of the main conveyor belt, formed by the series of plates 1 journalled to each other, and of the mentioned auxiliary trains 18 and 21, wherein it can be seen that the passage of one of the belts to the following is affected by means of the intermediary bridge-plates 19 and 22 which proportion respectively the pitch between the main belt and the first auxiliary belt 18, and between this latter and the second belt or auxiliary conveyor 21. This figure illustrates, at the same time, the arrangement of a third auxiliary belt 25 arranged transversally below the position of the second auxiliary conveyor train 21, this third auxiliary belt 25 being in charge of collecting the cut scrap material which fall through the spacings 24 between the belts 23 constituting the second auxiliary conveyor train 21.

This figure also illustrates that the auxiliary conveyor trains 18 and 21 are canalized by static partitions 21 and 26 supported, respectively, by bridges 20 of the frames or bases of said conveyor trains, the longitudinal arrangement of said partitions coinciding in prolongation of the projections or partitions of the first conveyor belt or main conveyor train of the machine.

Figure 6:
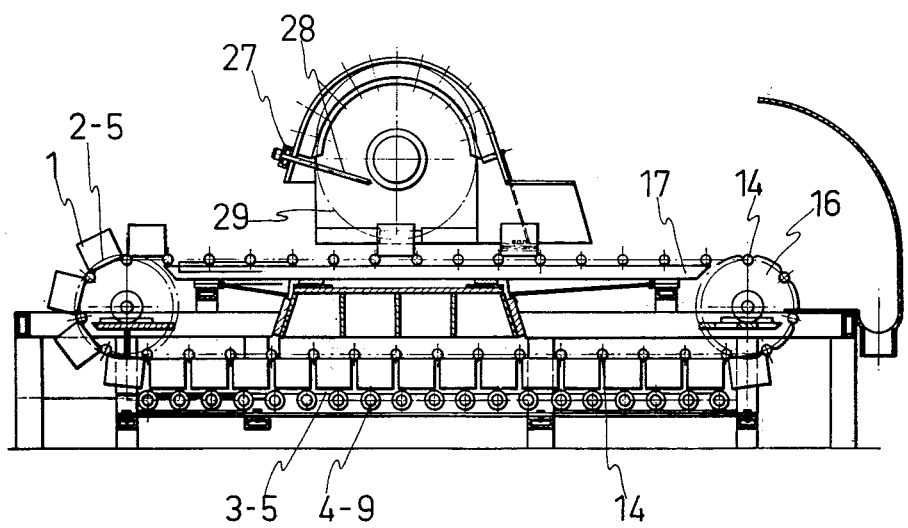
FIG. 6 shows a general side elevation of the cutting machine.

FIG. 6 illustrates a general schematic profile of the cutting machine in question, wherein it can be appreciated the general arrangement of the series of plates 1 journalled to each other which constitute the main conveyor, with the corresponding projections or partitions 2 and 5 which canalize the upper or working strand, and which in the lower or return strand act as shoes 3, 5 on pilot bearings 4–9, which prevent the formation of the catenary curve of the conveyor belt. This figure also represents the rail 17 which acts as a roller track for the rollers 14, components of the articulations of the parallel chains, and for the driving of the conveyor belt by toothed wheels 16.

This same FIG. 6 furthermore illustrates the arrangement of the cutting head or transversal shaft having cutting discs 29, between which are situated the cooling diffusing nozzles 28 which depart from the water collector 27.

Figure 7:
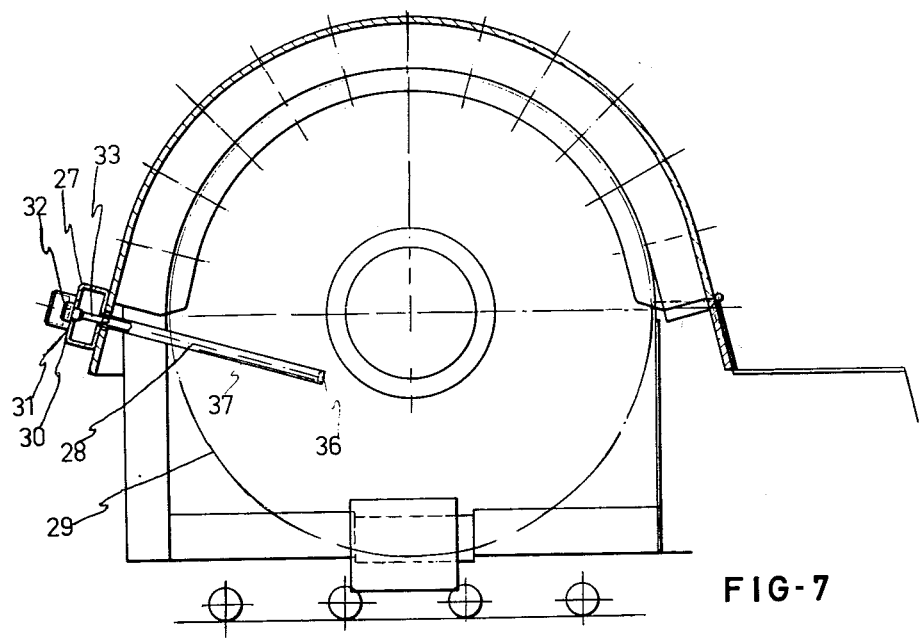
FIG. 7 shows to an enlarged scale a detail of the view shown in FIG. 6.

FIG. 7 represents an enlarged detail of the mentioned enlarged cutting head, wherein it can be appreciated more clearly the special shape, advantageously rectangular, of the water pipe collector 27 from which the diffusing nozzles 28 are unilaterally derived between the cutting discs 29, the opposite side 30 of said pipe collector 27 being comprised of a series of holes 31 having screwed edges in axial prolongation of each nozzle, which holes receive the selective coupling of stoppers 32 which have an axial spike 33 whose end penetrates and seals the axial passage of the corresponding diffusing nozzle 28.

It can also be seen in this same FIG. 7 that the diffusing nozzles 28 are constituted of cylindrical tubes, joined at one end by normal branching to said pipe collector 27, while the opposite end 36 is closed and has a longitudinal side groove 37 which establishes the diffusing nozzle directed towards the corresponding cutting disc 29.

Figure 8:
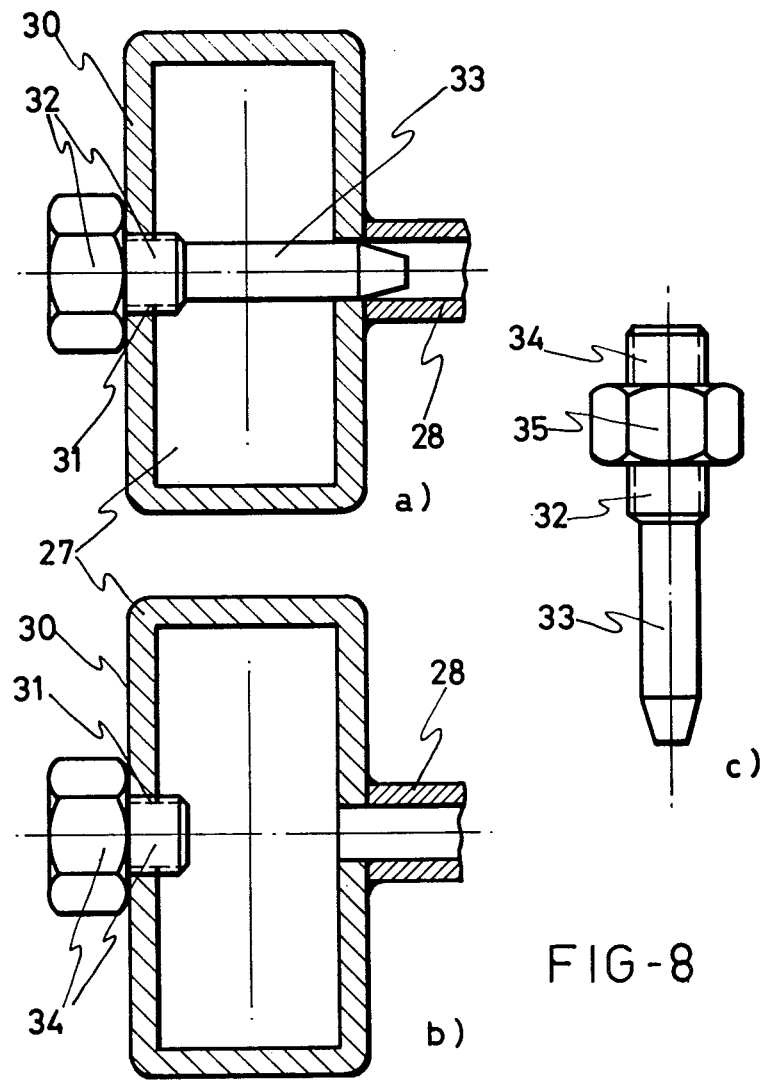
FIG. 8 shows to an enlarged scale a detail of the view shown in FIG. 7.

FIGS. 8a, 8b, 8c, respectively, illustrate the selective opening and closing of the diffusing nozzles 28 by the stoppers 32 and 34, one having the corresponding sealing axial spike 33 while the other is not provided therewith, as well as the possibility in FIG. 8c of a reversible stopper 35 which comprises, at its respective ends, the corresponding screwed extensions 32 and 34, one provided with the axial spike 32 while the other lacks it.

Figure 9:
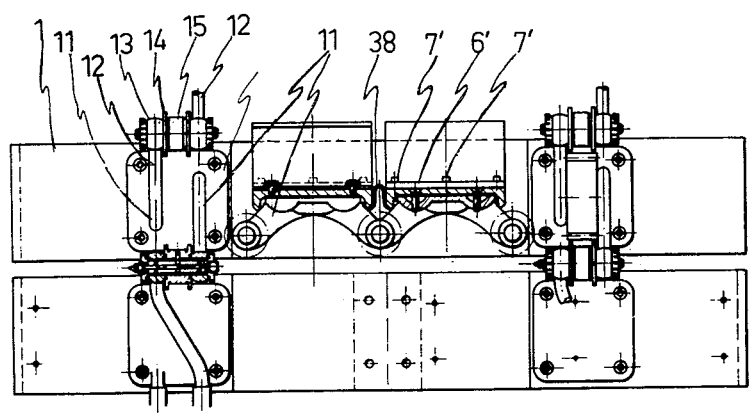
FIG. 9 shows an underneath plan view of two plates forming part of the main conveyor belt of the machine.

Finally, FIG. 9 represents a lower plan view of two of the plates 1 forming the main conveyor belt, in their corresponding coupling with the links of the driving chains, illustrating the constitution thereof by means of the anchoring plates 10 from which the arched arms 11 depart, with parallel ends 12, terminated in transversal cylinders 13 for joining of the links, between which the rollers 14 with the throat 15 are sandwiched. At the same time the transversal section of these two plates 1 of the main conveyor belt has been superimposed, to particularly illustrate the coating 6' of the upper surface of the plates 1 with the corresponding reliefs 7', as well as the sealed closure between plates by means of the resilient-flexible strips 38 which form transversal water evacuation channels towards convention collateral channels of the base of the machine.

The main constitutional and operational characteristics of the object of the invention can practically be deduced from the aforegoing description of the drawings, which are the following:

The continuous cutting machine for petrous and building materials is essentially characterized in that the plates 1, successively journalled to each other, which constitute the endless belt of the continuous conveyor, have a central projection or partition 2, longitudinally arranged in the direction of transport, which central projections or partitions establish a longitudinal partition of the conveyor which acts, in the upper or working strand, as a sub-divider of the conveyor belt into two zones, while in the lower or return strand said longitudinal partition acts as a shoe 3 sliding on bearings 4 or fixed rollers, which prevent the formation of the catenary curve of said series of plates 1, successively journalled to each other.

Another characteristic of the invention resides in that said central projections or partition 2 of the conveyor belt, is combined with other collateral projections or partitions 5 thereof, parallel to the central partitions 2 which establish therebetween longitudinal and parallel rectangular channels 6–7, each one of which channels form, between their respective walls 2–5 and bottom 6–7, positioning or butt dihedrals of the blocks of petrous or building material 8 to be cut simultaneously, in the passage of the conveyor belt under the corresponding transversal shaft having circular saws. The surface 6' of the bottom 6–7 of said channels or plates 1, successively journalled to each other forming same, comprises a coating formed of a resilient layer of rubber or the like, with upper reliefs 7', vulcanized on an independent sheet anchored by screws, which determine a perfect gripping of the supported piece 8 and permit an adequate depending of said saws or cutting discs.

Said collateral projections or partitions 5 of the conveyor belt collaborate, in the lower or return strand thereof, in the elimination of the catenary curve of the conveyor belt, said collateral partitions 5 likewise constituting sliding guides on bearings or fixed rollers 9.

Another characteristic resides in that the successive journalling to each other of the plates 1 of which the endless conveyor belt is formed, is constituted by the coupling of each plate 1 to each one of the links of two parallel endless articulated chains, which identical links of both chains are constituted by an anchoring plate 10 fixed to the reverse side of each plate 1 of the conveyor belt, said anchoring plate 10 having two lower arched arms 11, projecting at opposite sides thereof, which arms, having parallel ends 12, are finished off by transversal cylinders 13 for articulation between links, a roller 14 advantageously provided with a throat 15 being sandwiched axially between these adjacent linked cylinders, which roller acts as the driving means for the toothed wheels 16 of the chains and as a bearing on guide rails 17 which maintain the horizontal coplanar arrangement of the plates 1 of the conveyor belt, in the upper strand thereof.

At the same time, the plates 1 of the conveyor belt are hermetically sealed to each other by resilient-flexible strips 38, joined at their collateral ends to the corresponding ends of the adjacent plates 1, which strips 38 establish the bottom of an evacuation channel for the water falling from the saws or cutting discs, towards the collateral edges of the conveyor belt, wherein there are conventional collecting channels therefor.

Another characteristic resides in that the outlet end of the conveyor belt is joined to a second endless conveyor belt 18 or first auxiliary conveyor belt, to which the cut materials are transferred by means of an intermediate bridge-plate 19, the frame of this second conveyor belt or first auxiliary belt comprising a support bridge 20, on the upper strand thereof, for static partitions 21, canalizers of said materials in prolongation of the projections or partitions 2–5 of the first conveyor belt or main conveyor 1. At the same time this second conveyor belt 18 is, in turn, joined to a third conveyor train or second auxiliary conveyor 21 in longitudinal prolongation, to which said cut materials are transferred by means of a second intermediate bridge-plate 22, this third conveyor train 21 being constituted of a series of parallel endless belts 23 which retain a spacing 24 therebetween, which spacings 24 coincide in longitudinal prolongation with the central region of the channels of the first and second conveyor belts 1 and 18, these spacings proportioning the fall of the waste or scrap cut materials, which are collected by a lower transversal evacuation conveyor belt 25. Said third conveyor train or second auxiliary conveyor 23 has a like arrangement of canalizer partitions 26 as the second conveyor belt or first auxiliary conveyor 18.

Another characteristic resides in that it includes a water pipe collector 27 from which is unilaterally derived the series of diffusing nozzles 28, between which are sandwiched the cutting discs 29, receivers of the cooling liquid, said pipe collector 27 being constituted of a tubular body, advantageously rectangular, which has at the side 30 opposite to that of the diffusing nozzles 28, holes 31 with screwed edges in axial prolongation with each nozzle, which holes receive the selective coupling of stoppers 32 having an axial spike 33 which penetrates and seals the axial passage of the corresponding nozzle 28, and other stoppers 34, with a spike, which leaves the passage of the corresponding nozzles 28 free, thus both stoppers 32-34 are capable of being constituted of the corresponding ends of a single reversible stopper 35.

An ulterior characteristic resides in that the diffusing nozzles 28 of which it is comprised, are constituted of cylindrical tubes joined at one end in normal branching to said collector 27, while the opposite end 36 is closed and has a longitudinal side groove 37 which establishes the diffusing nozzle, conveniently directed towards the corresponding cutting disc 29.

It is not considered necessary to further extend this description, so that any person skilled in the art can perfectly understand the idea to be patented, as well as the advantages derived from its industrial exploitation, and which briefly mentioned, in their main points, are the following:

1. Easy and simplified arrangement of the main conveyor train of the machine, whose canalization determined by said longitudinal partitions, while improving and simplifying the functional qualities of the cutting operation, proportion, in turn, the sliding guide in the lower or return strand, thus preventing the formation of the catenary curve of the conveyor belt, improving the mechanical conditions of drive movement and stress thereof.

2. Original arrangement for controlling and adjusting the passage of cooling liquid, by means of said stoppers on the pipe collector, which permit an easy handling for the opening and closing of the diffusing nozzles in the necessary or operating cutting discs.

3. Simple arrangement of selecting and purifying of cut materials, due to the inclusion of said outlet auxiliary conveyors of the main conveyor, which contributes to a considerable reduction in labour.

4. Easy and simplified mechanical construction of its entire structure which contributes to a reduction in manufacturing costs, within an improvement of the general and functional conditions of the machine, which make it evident over other similar known machines.

I claim:

1. A cutting machine for petrous and building materials, comprising:

first endless conveyor belt means made up of a plurality of plates which extend transversely of the direction of travel of the conveyor belt means and are journalled together, each plate having a central projection extending in the direction of travel, said central projections together forming a longitudinal partition which acts to divide the upper strand of the conveyor belt means into two zones;

a cutting member positioned above the upper strand of the first endless conveyor belt means for cutting petrous or building material being transported on said upper strand;

second endless conveyor belt means aligned with the first endless conveyor belt means at the discharge end thereof, to receive and convey cut petrous or building material that has been conveyed by the first endless conveyor belt means to the discharge end thereof; and third endless conveyor belt means aligned with the second endless conveyor belt means at the discharge end thereof, to receive and convey cut petrous or building material that has been conveyed by the second endless conveyor belt means to the discharge end thereof, said third endless conveyor belt means comprising at least two parallel endless belts having a space therebetween for permitting waste material to fall from the third endless conveyor belt means.

* * * * *